United States Patent Office 3,141,887
Patented July 21, 1964

3,141,887
PROCESS FOR THE PREPARATION OF
LYSERGIC ACID AMIDES
Bianca Patelli and Luigi Bernardi, Milan, Italy, assignors to Società Farmaceutici Italia, Milan, Italy, a corporation of Italy
No Drawing. Filed Oct. 16, 1962, Ser. No. 231,015
Claims priority, application Italy Oct. 18, 1961
6 Claims. (Cl. 260—285.5)

Our invention relates to a new process of preparing the pharmacologically active lysergic acid amides, which may be substituted at the amidic nitrogen, by a simple, reproducible process using comparatively inexpensive reagents.

Lysergic acid amides have been already prepared. The processes reported in the literature, however, present disadvantages, such as synthesis with several intermediates, low end-product yields, or employment of expensive reagents.

Our invention overcomes these disadvantages and provides a process of preparing a lysergic acid amide which comprises treating lysergic acid with the phosgene-dimethylformamide complex and reacting the resulting reaction mixture with a nitrogen-containing base having at least one hydrogen atom attached to the nitrogen atom. The resulting lysergic acid amide, which may be substituted or not at the amidic nitrogen atom depending on the base used, may be isolated in known manner.

The process of our invention is carried out in two steps. In the first step, lysergic acid is reacted with the phosgene-dimethylformamide complex, and, in the second step, without isolating the resulting intermediate product, the reaction mixture is treated with a nitrogen base having at least one hydrogen atom attached to nitrogen atom. The reaction product of the first step has not been separated, and its chemical nature has not yet been investigated but it reacts with the nitrogenous base giving a high yield.

Lysergic acid, the starting material for the process of the invention, is employed in anhydrous form and may by any lysergic acid isomer, D-lysergic acid, L-lysergic acid, D-isolysergic acid, L-isolysergic acid or a racemic mixture thereof.

The phosgene-dimethylformamide complex may be prepared in known manner by introducing a predetermined amount of phosgene into a predetermined amount of dimethylformamide to obtain a solution of known concentration.

The reaction between lysergic acid and the phosgene-dimethylformamide complex takes place at a low temperature, below 0° C., but is preferably carried out between —5° and —15° C. The diluent for this first step is usually dimethylformamide or acetonitrile. The best results have been obtained using from 1 to 5 mols, preferably from 1 to 2 mols of the phosgene-dimethylformamide complex per mol of lysergic acid.

The reaction product of the first step may be directly reacted with the nitrogenous base. This may be carried out by adding the base dissolved or not in an organic solvent, such as dimethylformamide or acetonitrile, at room temperature or below. Good results are obtained by adding the base at below 0° C., preferably from —5° to —15° C., and keeping the mixture at room temperature for some hours to complete the reaction. From 1 to 7, preferably from 3 to 5 mols the base may be added per mol of lysergic acid.

Among the nitrogen-containing bases having at least one hydrogen atom attached to the nitrogen atom which may be used in the process of the invention are ammonia, hydrazine, primary amines such as ethylamine, ethanolamine, glycine, aminopropanol, aniline, benzylamine and secondary amines such as diethylamine, diphenylamine, methylaniline, and ephedrine.

The reaction of the said complex with L-(+)-2-aminopropanol according to the process of the invention is of particular interest for the preparation of ergometrine, which is used therapeutically as an oxytocic drug.

The lysergic acid amides obtained by the process of the invention may be separated and purified in known manner. Generally, the reaction mixture is diluted with water, then acidified and extracted with an organic solvent to recover any unreacted lysergic acid. The resulting aqueous solution is treated with sodium chloride, made alkaline and extracted with an organic solvent. After distilling off the solvent, the remaining residue is recrystallized to yield the lysergic acid amide in pure form. In order to obtain the products in crystalline form, for easier purification, the usual salts of organic acids, such as maleates and tartrates may be formed.

The invention includes amides produced by the process of the invention and pharmaceutical compositions containing them.

The following examples serve to illustrate, but not to limit, our invention.

EXAMPLE 1

N-[L-(+)-1-Hydroxyisopropyl]-D-Lysergamide

To a suspension of 1 g. of anhydrous lysergic acid in 20 cc. of dimethylformamide cooled to —10° C., 4 cc. of dimethylformamide containing 0.680 g. of phosgene-dimethylformamide complex are added. The reaction mixture is stirred for 15 minutes at this temperature, whereupon 1 g. of L-2-aminopropanol in 5 cc. of dimethylformamide is added. Stirring is carried on for 2 hours at 0° C. The mixture is then diluted with water, acidified with tartaric acid and thrice extracted with chloroform. Sodium chloride and ethanol are added to the solution of the acid, made alkaline with dilute aqueous ammonia and extracted three times with methylene dichloride. The extracts are collected and the solvents are removed in vacuo. The residue is dissolved in methanol, acidified with maleic acid and precipitated with ether. After cooling overnight, the precipitate is filtered and washed with ether. The crude product is dissolved in methanol and reprecipitated by addition of ether.

The ergometrine is obtained as maleate melting at 166–167° C., $[\alpha]_D^{20}=+50°$ C. (c=1 in water).

Ergometrine may be isolated not only as the maleate, but also as the free base which may be separated as follows. The residue obtained after evaporation of the methylene dichloride, instead of being disolved in methanol and treated with maleic acid, is taken up with a small amount of warm benzene and allowed to crystallize. The free base, melting at 154–158° C., is obtained.

EXAMPLE 2

N-Benzyl-D-Lysergamide 0.500 g. of anhydrous lysergic acid, suspended in 10 cc. of dimethylformamide, cooled to —10° C. are reacted with 2 cc. of dimethylformamide containing 0.340 g. of the phosgene-dimethylformamide complex during 20 minutes. 2 cc. of benzylamine in 10 cc. of dimethylformamide are then added, keeping the mixture at —10° C. for 10 minutes and afterwards at room temperature for 10 minutes. After diluting with chloroform, the liquid is washed with a 1 N solution of sodium hydroxide, with water, after which the solvent is distilled off in vacuo. The oily residue is dissolved in methanol, acidified with maleic acid and some ether is added until crystallization starts. The mixture is kept overnight at 0° C. and then filtered and washed with ether. The crude product which separates is redissolved in methanol, decolored with charcoal and reprecipitated by the addition of ether. The maleate of N-benzyl-D-lysergamide, melting at 195° C., is obtained:

$$[\alpha]_D^{20} = -15° \text{ C. (c.=1 in methanol)}$$

EXAMPLE 3

N-Ethyl-D-Lysergamide

The preparation is carried out in the same manner as in Example 2, using however 0.300 cc. of monoethylamine in lieu of benzylamine and tartaric acid in lieu of maleic acid. The tartrate of N-ethyl-D-lysergamide, melting at 150–152° C., is obtained:

$$[\alpha]_D^{20} = +78° \text{ C. (c.=0.5 in 50% aqueous alcohol)}$$

EXAMPLE 4

D-Lysergamide

The preparation is carried out in the same way as in Example 1, but using 2 cc. of concentrated aqueous ammonia in lieu of L-2-aminopropanol. The maleate of D-lysergamide, melting at 160–170° C. (with decomposition) is obtained.

EXAMPLE 5

N,N-Diethyl-D-Lysergamide

The preparation is carried out in the same way as in Example 2, using however 0.7 g. of diethylamine instead of benzylamine and tartaric acid instead of maleic acid. The tartrate of N,N-diethyl-D-lysergamide, melting at 193–197° C., is obtained:

$$[\alpha]_D^{20} = +26° \text{ C. (c.=1 in water)}$$

EXAMPLE 6

N,N-Diethyl-D-Lysergamide

The preparation is carried out in the same way as in Example 5, employing however acetonitrile instead of dimethylformamide as the diluent for the lysergic acid. The tartrate of N,N-diethyl-D-lysergamide, melting at 192–198° C. is obtained:

$$[\alpha]_D^{20} = +25° \text{ C. (c.=1 in water)}$$

We claim:
1. A process for the preparation of N-[L-(+)-1-hydroxyisopropyl]-D-lysergamide, which comprises suspending anhydrous lysergic acid in dimethylformamide, reacting the suspended lysergic acid with the complex phosgene-dimethylformamide at a temperature between —5° and —15° C., adding L-2-aminopropanol at a temperature between —5° and —15° C. to the reaction mixture, and separating N-[L-(+)-1-hydroxyisopropyl]-D-lysergamide.

2. A process for the preparation of N-benzyl-D-lysergamide, which comprises suspending anhydrous lysergic acid in dimethylformamide, reacting the suspended lysergic acid with the complex phosgene-dimethylformamide at a temperature between —5° and —15° C., adding benzylamine at a temperature between —5° and —15° C. to the reaction-mixture and separating N-benzyl-D-lysergamide.

3. A process for the preparation of N-ethyl-D-lysergamide, which comprises suspending anhydrous lysergic acid in dimethylformamide, reacting the suspended lysergic acid with the complex phosgene-dimethylformamide at a temperature between —5° and —15° C., adding monoethylamine at a temperature between —5° and —15° C., to the reaction mixture, and separating N-ethyl-D-lysergamide.

4. A process for the preparation of D-lysergamide, which comprises suspending anhydrous lysergic acid, reacting the suspended lysergic acid with a phosgene-dimethylformamide complex at a temperature between —5° and —15° C., adding aqueous ammonia between —5° and —15° C. to the reaction mixture and separating D-lysergamide.

5. A process for the preparation of N,N-diethyl-D-lysergamide, which comprises suspending anhydrous lysergic acid in dimethylformamide, reacting the suspended lysergic acid with the phosgene-dimethylformamide complex at a temperature between —5° and —15° C., adding diethylamine at a temperature between —5° and —15° C. to the reaction mixture, and separating N,N-diethyl-D-lysergamide.

6. A process of preparing lysergic acid amides, which comprises suspending anhydrous lysergic acid in a suitable diluent selected from the group consisting of dimethylformamide and acetonitrile, reacting the suspended lysergic acid with a phosgene-dimethylformamide complex at a temperature below 0° C., and reacting the resulting reaction mixture with a nitrogen-containing base having at least one hydrogen atom attached to the nitrogen atom, said base selected from the group consisting of ammonia, hydrazine, ethylamine, ethanolamine, glycine, aminopropanol, aniline, benzylamine, diethylamine, diphenylamine, methylaniline and ephedrine.

References Cited in the file of this patent

Garbrecht: J. Organic Chem., vol. 24, pages 368–72 (1959).